(12) United States Patent
Vossel et al.

(10) Patent No.: US 7,306,209 B2
(45) Date of Patent: Dec. 11, 2007

(54) HYDRAULICALLY DAMPING RUBBER BUSH BEARING FOR VERTICAL MOUNTING

(75) Inventors: Andreas Vossel, Osnabrück (DE); Klaus Kramer, Neuenkirchen (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 11/169,067

(22) Filed: Jun. 28, 2005

(65) Prior Publication Data

US 2005/0236751 A1 Oct. 27, 2005

Related U.S. Application Data

(63) Continuation of application No. PCT/DE2004/000671, filed on Mar. 30, 2004.

(30) Foreign Application Priority Data

Apr. 4, 2003 (DE) ................ 103 15 645

(51) Int. Cl.
 *F16F 9/00* (2006.01)
(52) U.S. Cl. ................ 267/140.13
(58) Field of Classification Search .............. 267/140.12–141.7, 219
See application file for complete search history.

(56) References Cited

U.S. PATENT DOCUMENTS

| 4,634,108 | A |   | 1/1987  | Munch               |
|-----------|---|---|---------|---------------------|
| 4,786,036 | A | * | 11/1988 | Kanda ........ 267/140.12 |
| 4,883,260 | A | * | 11/1989 | Kanda ........ 267/140.12 |
| 4,953,833 | A | * | 9/1990  | Schmidt et al. ...... 267/140.12 |
| 5,310,168 | A | * | 5/1994  | Tanahashi ....... 267/140.12 |
| 5,338,012 | A | * | 8/1994  | Kranick ......... 267/140.5 |
| 5,560,593 | A | * | 10/1996 | Hofmann et al. .... 267/219 |
| 5,657,510 | A | * | 8/1997  | Satori et al. ......... 16/2.2 |
| 5,954,317 | A | * | 9/1999  | Meyer et al. ..... 267/140.12 |
| 6,575,441 | B2| * | 6/2003  | Lefebvre ........ 267/281 |
| 6,659,437 | B2| * | 12/2003 | Tatura ........... 267/141 |
| 2002/0014730 | A1 | * | 2/2002 | Maier .......... 267/140.12 |

FOREIGN PATENT DOCUMENTS

| DE | 197 29 290 A1 | 4/1998 |
| DE | 100 57 191 A1 | 5/2002 |
| EP | 0 410 455 A1  | 1/1991 |
| EP | 0 995 928 A2  | 4/2000 |

* cited by examiner

*Primary Examiner*—Chris Schwartz
(74) *Attorney, Agent, or Firm*—McGlew and Tuttle, P.C.

(57) ABSTRACT

A hydraulically damping rubber bush bearing suitable for absorbing cardanic loads in the vertical installed position and yet has a simple geometry and construction. The bearing has chambers receiving the damping agent and has an undercut in the direction of the bearing axis at least in the area of one of their axial ends. An inner cage and the elastomeric bearing body are axially shortened in the corresponding circumferential section compared to the rest of their circumferential sections.

28 Claims, 5 Drawing Sheets

HYDRAULICALLY DAMPING RUBBER BUSH BEARING FOR VERTICAL MOUNTING

CROSS REFERENCE TO RELATED APPLICATION

This is a continuation of and claims the benefit (35 U.S.C. § 120 and 365(c)) of copending International Application PCT/DE 2004/000671 of Mar. 30, 2004, which designated inter alia the United States and which claims the priority of German Application DE 103 15 645.3 of Apr. 4, 2003. The entire contents of each application is hereby incorporated by reference in its entirety.

FIELD OF THE INVENTION

The present invention pertains to a hydraulically damping rubber bush bearing, preferably for mounting the control arm of a motor vehicle axle, which is designed for vertical mounting and for absorbing cardanic loads in this installed position.

BACKGROUND OF THE INVENTION

Hydraulically damping rubber bearings, so-called hydrobushes, are installed, in general, horizontally, i.e., lying in relation to their bearing axis, in connection with the mounting of parts of the wheel suspension of a motor vehicle. The currently common horizontal mounting of the hydrobushes has the drawback that mounting in the vehicle is relatively expensive. This is linked with the fact that automatic feeding of the bolt used to fasten the bush is basically not possible and fully automatic mounting is therefore very extensively ruled out. The bearings are therefore mounted usually manually, which leads to an increase in the manufacturing costs.

In case of vertical installation, which is more favorable for automatic mounting, most of the hydrobushes used so far have problems in terms of service life. Above all, cardanic loads lead to increased wear in this case and, as a consequence of this, to reduced service life of the bearings. Prior-art constructions show especially great problems in the transmission of cardanic angles of up to ±20°.

DE 100 57 191 A1 describes a hydraulically damping rubber bearing, whose cardanic loadability was also increased in case of vertical installation by special design measures. The metallic inner part has bulging, approximately spherical outer surfaces for this purpose in its axially middle area. The rubber springs connected with it by vulcanization, as well as an intermediate sleeve arranged in the bearing are adapted to this shape of the contour of the inner part. A comparatively complicated bearing geometry is obtained as a result, which leads to increased costs for the manufacture of the bearing.

SUMMARY OF THE INVENTION

The object of the present invention is therefore to design a bearing that is suitable for absorbing cardanic loads in case of a vertically installed position such that this has a simple geometry and construction. As a result, the bearing is said to be able to be manufactured at low cost despite the advantage that fully automatic mounting of the bearing is possible in case of appropriate use.

The hydraulically damping rubber bush bearing proposed according to the present invention, which is designed for vertical mounting, first comprises, in the known manner, an essentially cylindrical, metallic inner part, a metallic sleeve (inner cage) arranged concentrically therewith, and an elastomeric bearing body, which is arranged between the inner part and the inner cage and is connected with them by vulcanization. Distributed over its circumference, at least two chambers connected with one another by a channel are arranged in the elastomeric bearing body for receiving a fluid damping agent. In a manner that is essential for the present invention, the radially inner wall of each chamber (inner chamber wall) passes over from a section that follows the bearing axis essentially in parallel in an area of at least one of the axial ends of the chamber into a section having a shape that is sloped against the bearing axis. As a result, an undercut extending in the direction of the bearing axis is formed. At the same time, the inner cage and the elastomeric bearing body are axially shortened compared to the rest of their circumferential sections corresponding to each axial end of a chamber, which end is provided with such an undercut, in a circumferential section corresponding essentially to the extension of the particular chamber. This bearing construction, which is characterized above all by the combination of the features of an undercut chamber inner wall and an inner cage correspondingly shortened axially as well as an axially shortened bearing body, enables the bearing in an especially advantageous manner to absorb cardanic effects by a corresponding spring deflection via the chambers filled with the damping agent. Up to a cardanic angle of ±20°, cardanic forces cause a markedly lower wear on the bearing than in case of, e.g., vertically installed bush bearings of the conventional construction. Moreover, it shall be stressed as an especially advantageous feature that especially the inner part or the inner tube of the bearing can remain unchanged in its usually cylindrical shape, which leads to a simpler construction than in the case of the bearing designed for vertical installation, which was described in the description of the state of the art. The preparation of the undercut during the casting of the bearing with the elastomer as well as the axial shortening of the elastomeric bearing body in this area are not critical anyway from the viewpoint of the manufacturing technology, but the manufacture of the inner cage shaped correspondingly at the axial front ends also leads to an insignificant increase in the costs only.

In the design according to the present invention as shown, the rubber bush bearing can be mounted either directly at the corresponding point, for example, in the area of the wheel suspension of a motor vehicle, or it may be received for mounting by a preferably metallic outer sleeve. In the latter case, the outer sleeve is likewise shortened axially in the area of the undercuts of the chamber inner walls analogously to the bearing body and to the inner cage.

Depending on the intended use of the bearing, different embodiment variants of the bearing according to the present invention are possible while the basic idea of the invention is maintained. Corresponding to a possible embodiment, the bearing has two damping agent chambers, which have an undercut in the area of one of their axial ends. To make it possible to absorb cardanically acting forces, the undercuts of the two chambers are arranged diametrically in relation to one another relative to the axial extension of the bearing.

In an embodiment of the rubber bush bearing according to the present invention that is especially relevant for practice, two chambers, which have an undercut axially on both sides, are formed in the elastomeric bearing body of the rubber bush bearing. The two chambers are preferably arranged at an angle of 180° in relation to one another relative to the circumference of the bearing, but this also depends on the states of load to be expected during the use of the bearing.

The undercut of the inner chamber walls can already be obtained, in principle, by their corresponding shape. This also leads already to an improvement of the cardanic properties. However, the walls of the chambers located radially on the outside (outer chamber walls) preferably also have a shape sloped against the bearing axis in the area of the undercut formed by the corresponding shape of the corresponding inner chamber wall. In the area of a section led in parallel to the bearing axis and through the center of the circumferential extension of a chamber, the shape of the outer chamber walls follows essentially that of the inner chamber walls. The inner and outer chamber walls are optionally located at a constant distance from one another in the area in which they have basically the same shape.

However, corresponding to an advantageous variant, the distance between the inner and outer chamber walls increases in the areas that are the outer areas relative to the circumferential extension of the chambers. The chambers consequently expand toward these outer areas and form an opening at an angle of 90° in relation to the direction of damping. At the same time, rubber stops are formed due to the reduced distance between the inner and outer chamber walls in the area of the center of the circumferential extension of the chambers. However, it is also possible to make the stops out of plastic.

Insofar as this is necessary based on the intended use and the requirements associated therewith, special insert parts may be arranged between the bearing body and the inner part and/or the inner cage corresponding to possible variants of the bearing according to the present invention to shorten the radial path of the bearing body of the bearing. Such insert parts, which preferably consist of metal or plastic, are introduced during the mounting of the bearing.

According to another possible embodiment of the bearing according to the present invention, the metallic inner tube of the bearing has a flattened area extending over its entire axial length in the areas adjoining an inner chamber wall.

The present invention shall be explained once again in greater detail below on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENT

Figure 1:
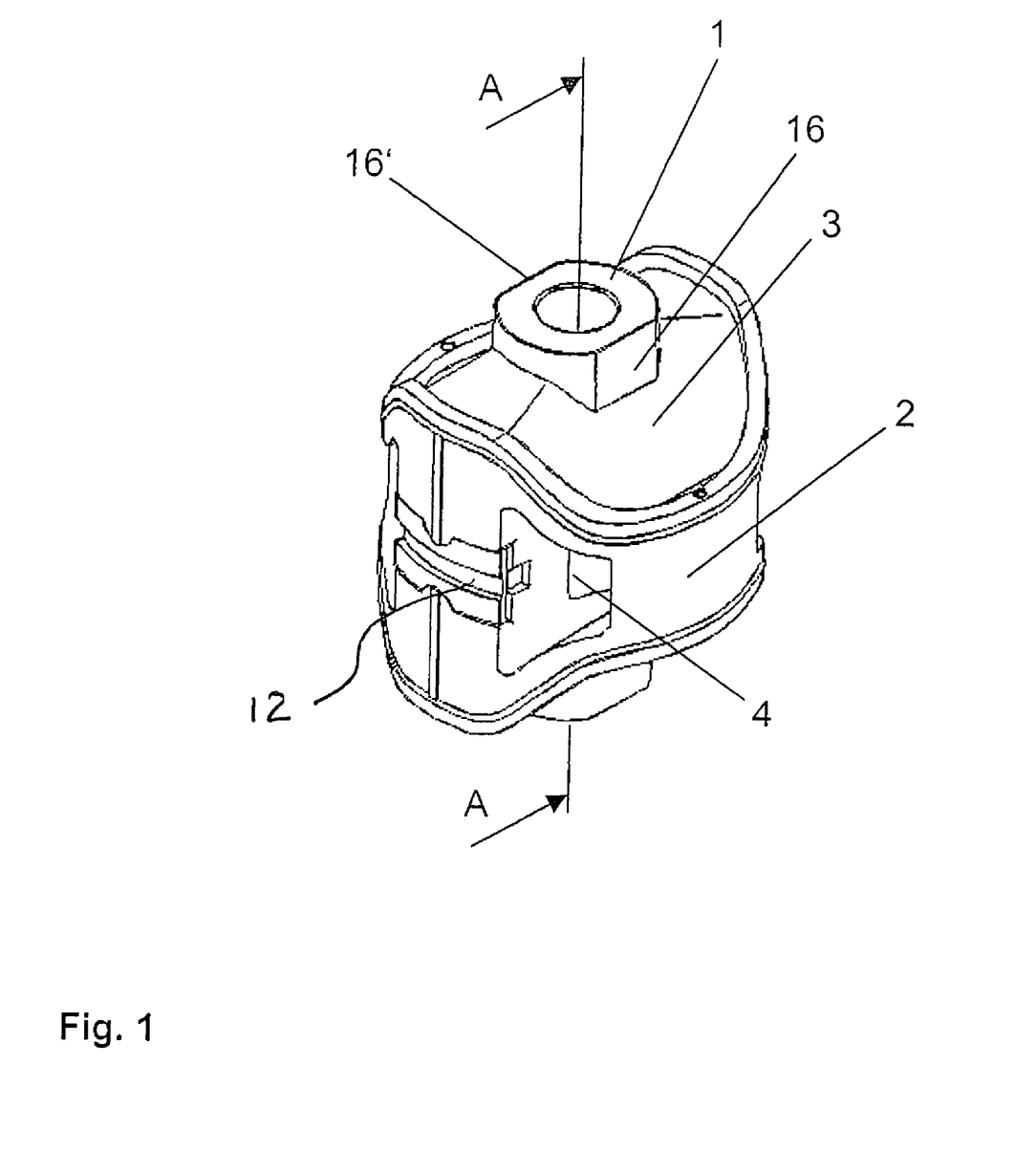
FIG. 1 is a three-dimensional view of the bearing according to the present invention.

FIG. 1 pertains to a three-dimensional view of an exemplary embodiment of the bearing according to the present invention. However, a more detailed explanation of the individual parts of the bearing shall be offered on the basis of the sectional views in FIGS. 2 through 4.

Figure 2:
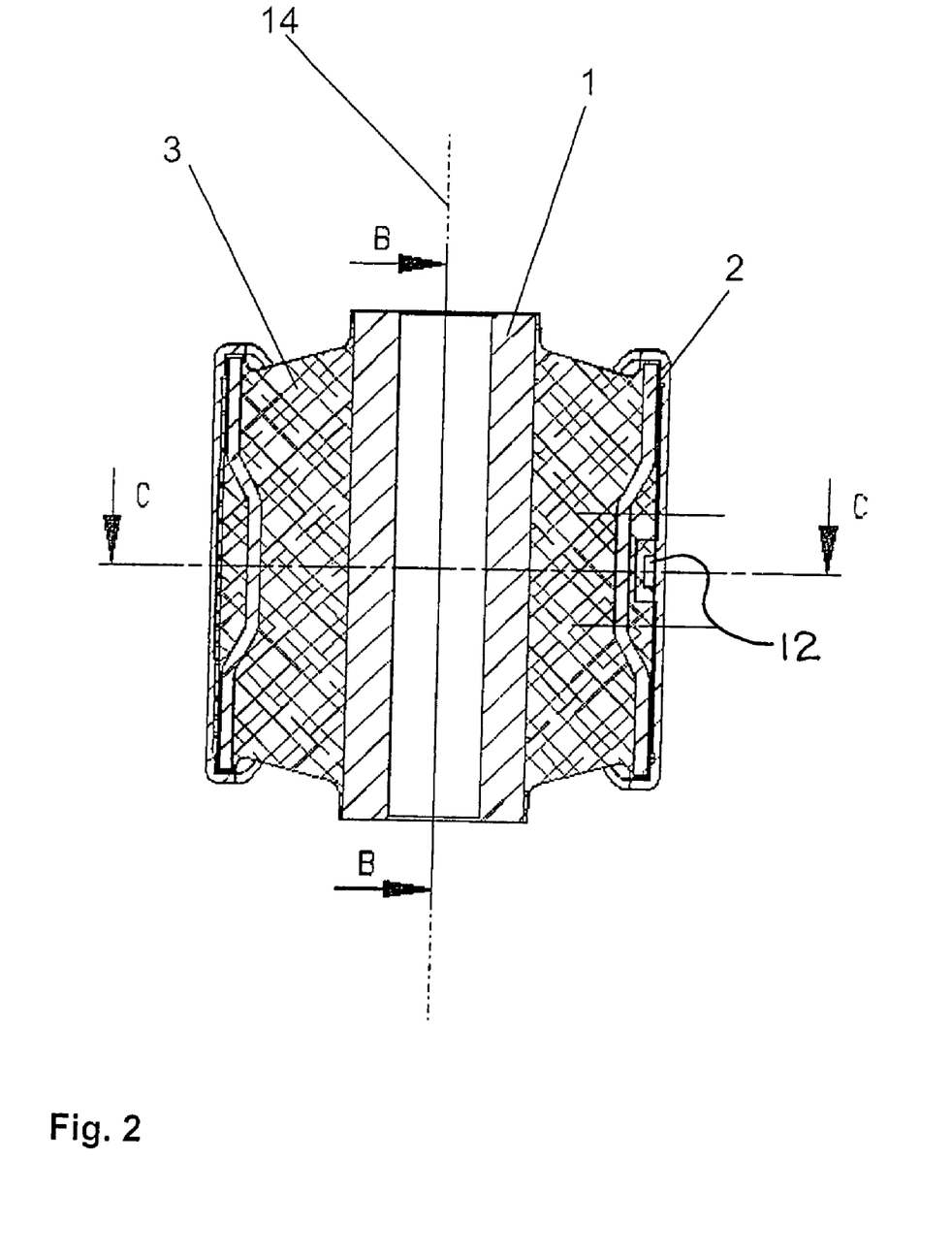
FIG. 2 is a sectional view of the bearing according to FIG. 1 with a section along line A-A of FIG. 1 and showing two opposing long sections of the an outer sleeve.

FIG. 2 shows the bearing according to FIG. 1 in a sectional view with a section led along line A-A. The essential parts of the bearing, which are already known as such from the state of the art, can be recognized in the view. Thus, the bearing comprises a metallic, essentially cylindrical inner part or inner tube 1, a sleeve 2 arranged concentrically therewith (inner cage), and the elastomeric bearing body 3, which is arranged between these parts and is connected with them by vulcanization. The chambers 4, 4' formed in the elastomeric bearing body 3 for receiving the fluid damping agent are not recognizable in this view because of the sectional plane. However, it can be seen that upper and lower edges of the inner cage 2 provide two opposing long sections of the inner cage 2 that can be recognized in this view have approximately the same axial length as the inner part or inner tube 1.

Figure 3:
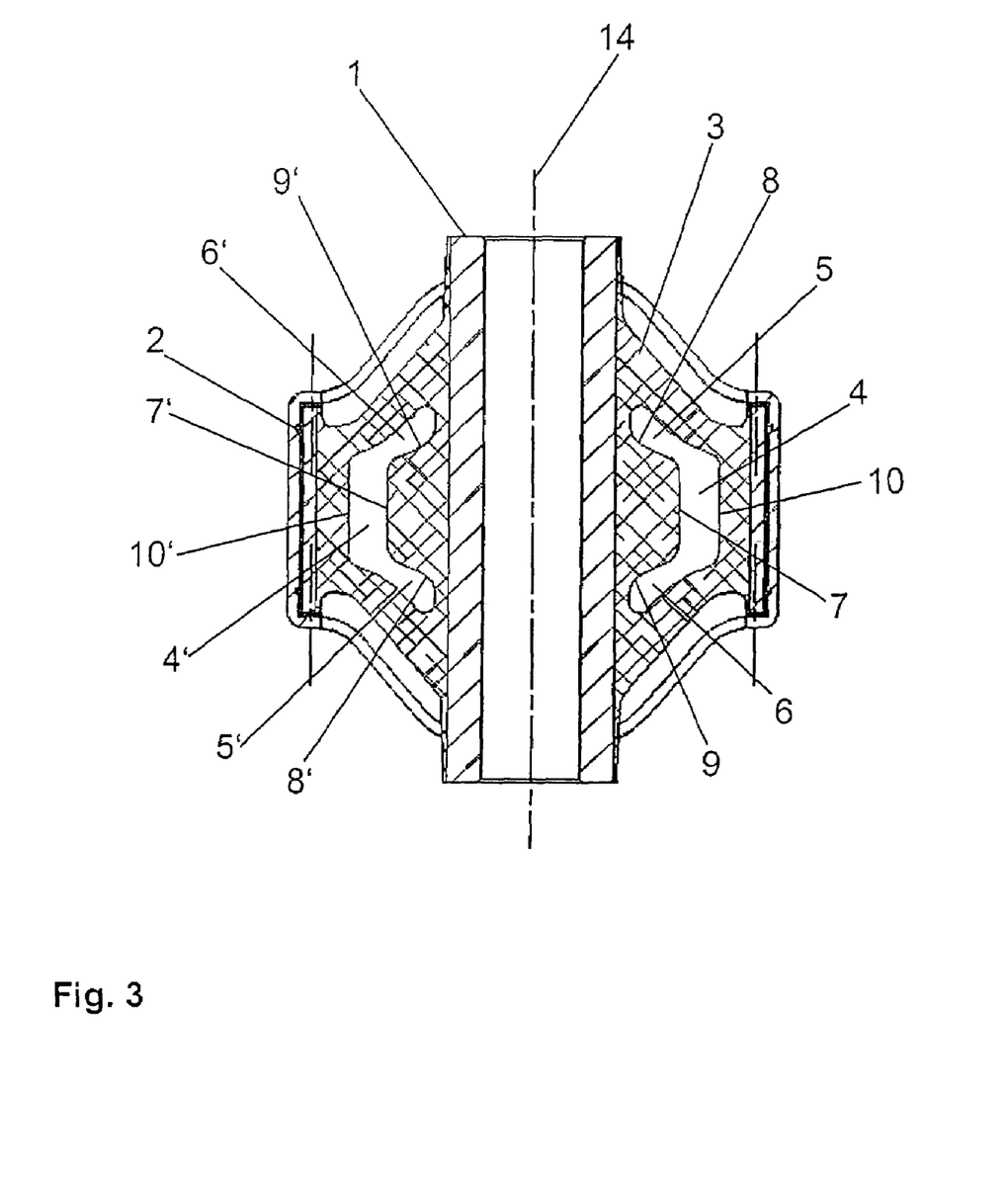
FIG. 3 is a sectional view along section line B-B of FIG. 2, showing the bearing according to FIG. 1 or according to FIG. 2 and showing two opposing short sections of the an outer sleeve.

However, as is shown in FIG. 3, the conditions are completely different in respect to a section led along line B-B. The upper and lower edges of the inner cage 2 provide two opposing short sections of the inner cage 2 and of the bearing body 3 that can be recognized in FIG. 3 and are markedly shortened concerning their axial extension compared to the inner tube 1. As can be seen in FIGS. 1, 2 and 3, the bearing body 3 has an upper surface following a path of an upper edge of the inner cage 2 from long sections to adjacent short sections and has a lower surface following a path of the inner cage 2 from long sections to adjacent short sections to provide shortened axial extent portions respectively adjacent to the short sections of the cage 2 and longer axial extent portions respectively adjacent to the long sections of the cage 2. In FIG. 3, the chambers 4, 4' for receiving the damping agent can be recognized in the view. The chambers 4, 4' show, as can be clearly recognized here, a special geometry for accomplishing the object of the present invention. An undercut 5, 5', 6, 6' each, extending in the direction of the bearing axis 14, is formed in the area of their axial ends. The inner and outer chamber walls pass over at the axial ends of the chambers from a shape or section 7 following the bearing axis essentially in parallel into a section 8, 8', 9, 9' having a shape sloped against the bearing axis 14 (and generally following the upper and lower surfaces of the bearing body 3). The chambers 4 and 4' are in the shortened axial extent portions, in the region of the axially shorter sides of the inner cage 2. It can be recognized that the shape of the respective outer chamber wall 10, 10' follows essentially the inner chamber wall in the exemplary embodiment being shown. The improved stability of the bearing in respect to cardanic loads is achieved in case of vertical installation due to the formation of the undercuts 5, 5', 6, 6'. The axially middle areas of the chambers 4, 4' advantageously form stop faces 15, 15' (see FIG. 4). With this design, the bearing can absorb cardanic loads with a cardanic angle of ±20° without problems.

Figure 4:
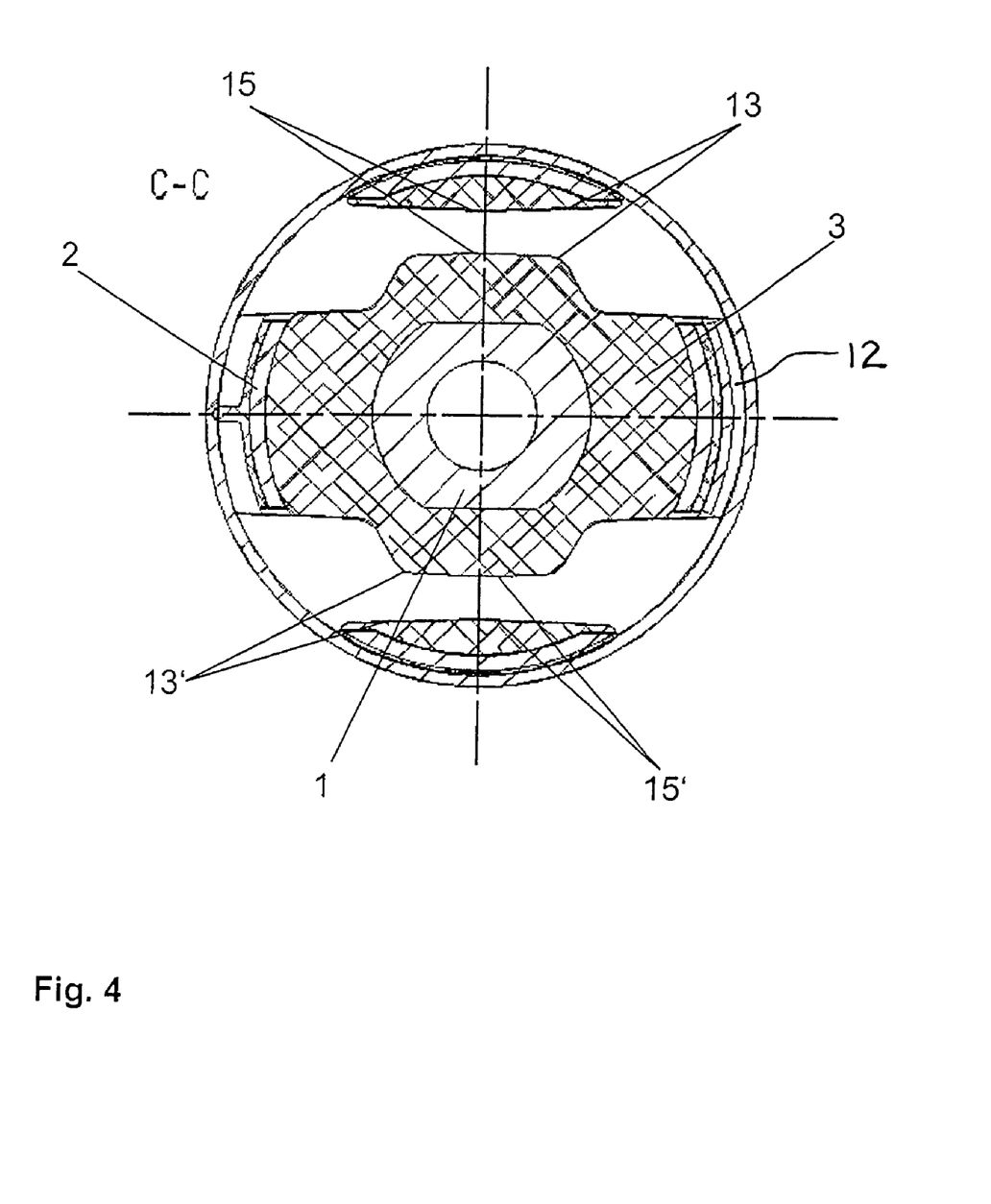
FIG. 4 is a sectional view along section line C-C of FIG. 2, showing the bearing according to the above figures.
Figure 5:
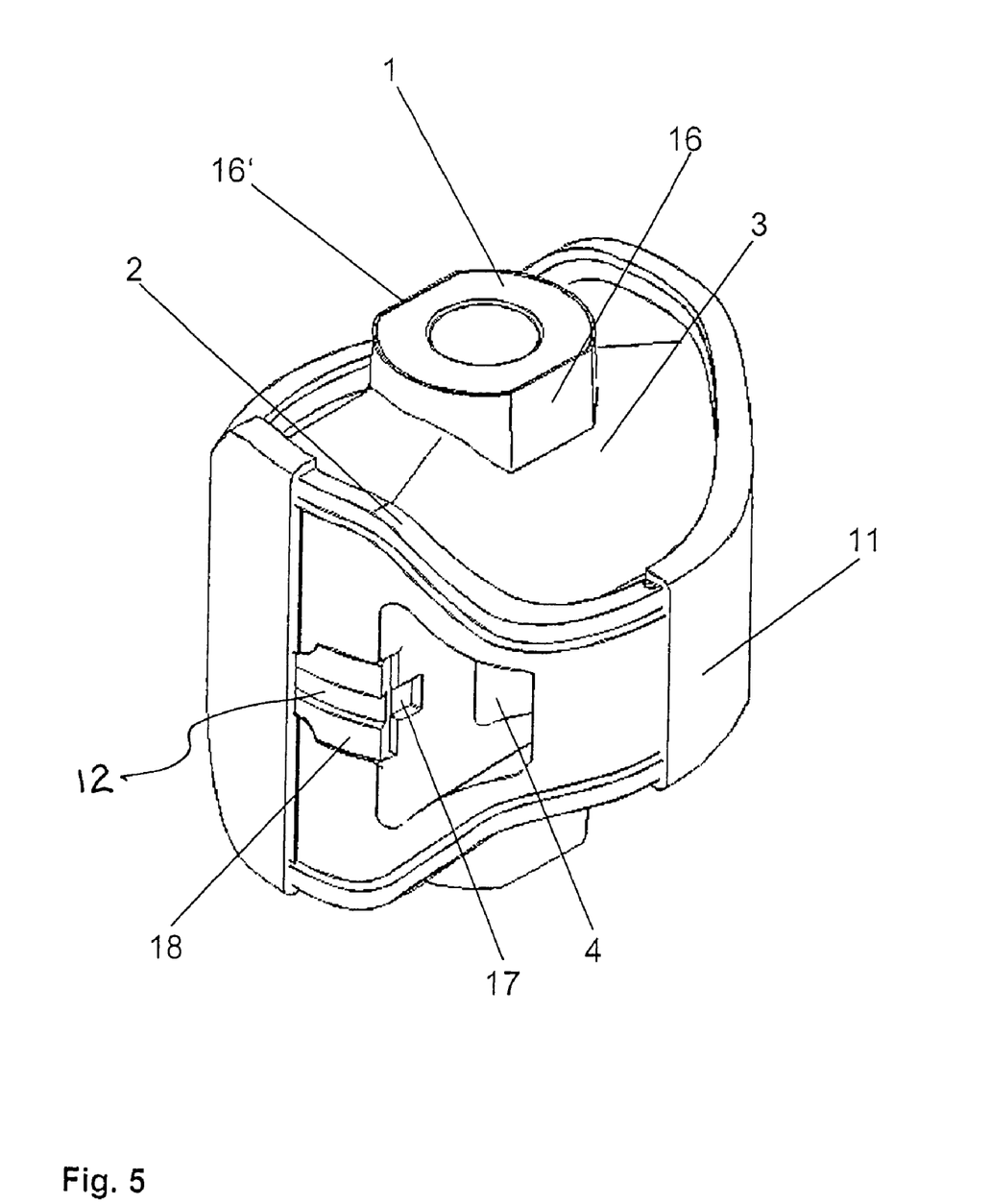
FIG. 5 is a three-dimensional view of a bearing according to FIG. 1 with an outer sleeve (a channel carrier element).

As it becomes apparent from FIG. 4 in connection with FIG. 1, chamber openings (13, 13'), which are arranged at right angles to the direction of load that is given in case of a vertical installation position, are formed due to the shape of the contour of the inner chamber walls and of the outer chamber walls 10, 10' with an expansion of the chambers 4, 4' in the outer areas of their circumferential extension. To complement the bearing, a channel carrier element 18, which is shown in FIG. 5 only, is clipped into the recesses 17 recognizable in FIG. 1 during the manufacture of the bearing, so that the chambers 4, 4' are connected by the channel 12 formed in them in such a way that they conduct flow and the damping agent can flow to and fro between the chambers 4, 4' during loading of the bearing. However, a corresponding channel 12 may also be vulcanized into the elastomeric bearing body 3. A separate channel carrier is dispensable in this case. The bearing according to the present invention may be mounted in the exemplary embodiments shown in FIGS. 1 through 4 either directly at a corresponding point determined by its intended use or also surrounded by an additional outer sleeve 11, preferably one made of metal. The latter is illustrated once again in FIG. 5, again in a three-dimensional view, the bearing being shown with a partial section in the outer sleeve 11. The inner part 1 of the bearing has, as can be recognized in FIGS. 1 and 5, a flattened area 16, 16' in the areas of the respective chambers 4, 4'.

While a specific embodiment of the invention has been shown and described in detail to illustrate the application of the principles of the invention, it will be understood that the invention may be embodied otherwise without departing from such principles.

What is claimed is:

1. A hydraulically damping rubber bush bearing, designed for vertical mounting, the bush bearing comprising:
   an essentially cylindrical, metallic inner part having an axial length along a bearing axis;
   a metallic sleeve arranged concentrically with said inner part, said metallic sleeve defining an inner cage located at predetermined distances away from said inner part, said inner cage having a varied axial length parallel to said bearing axis with two opposing long sections having a longest axial extent, and two opposing short sections having a shortest axial extent, each short section being disposed between adjacent long sections, an axial distance between axially outer ends of said short sections being less than the axial distance between the axially outer ends of said long sections;
   an elastomeric bearing body arranged between said inner part and said inner cage, said elastomeric bearing body being connected with said inner cage by vulcanization, said elastomeric bearing body defining at least two chambers arranged diametrically opposed to one another with respect to said bearing axis and radially arranged between said metallic inner part and said short sections, said two chambers being connected with one another by a channel, said chambers being distributed over at least a portion of the circumference of said elastomeric bearing body, for receiving a fluid damping agent, a radially inner chamber wall of each said chamber passing over from a section following said bearing axis essentially in parallel in an area of at least one of the axial ends of said chamber into a section having a shape sloped relative to said bearing axis and forming an undercut toward a direction of said bearing axis, said elastomeric bearing body having shortened axial extent portions respectively adjacent to said short sections of said inner cage and having longer axial extent portions respectively adjacent to said long sections of said inner cage forming a first axial end outer contour at a first axial end and a second axial end outer contour at a second axial end
   with a distance between said first axial end outer contour and said second axial end outer contour being less in a region of said shortened axial extent portions than in a region of longer axial extent portions
   with a first of said chambers located in a first shorter portion of said elastomeric bearing body, between said first axial end outer contour and said second axial end outer contour, in a region of shortened axial extent portions wherein said distance is less
   with a second of said chambers located a second shorter portion of said elastomeric bearing body, between said first axial end outer contour and said second axial end outer contour, in another region of shortened axial extent portions wherein said distance is less
   with said first of said chambers separated from said second of said chambers by a first longer portion of said elastomeric bearing body, between said first axial end outer contour and said second axial end outer contour, in a region of longer axial extent portions wherein said distance is greater
   with said first of said chambers separated from said second of said chambers by a second longer portion of said elastomeric bearing body, between said first axial end outer contour and said second axial end outer contour, in a region of longer axial extent portions wherein said distance is greater
   with said first shorter portion of said elastomeric bearing body located between said inner part and said inner cage and between said first longer portion of said elastomeric bearing body and said second longer portion of said elastomeric bearing body
   with said second shorter portion of said elastomeric bearing body located between said inner part and said inner cage and between said first longer portion of said elastomeric bearing body and said second longer portion of said elastomeric bearing body; and
   a fluid damping agent in said first chamber and said second chamber.

2. A hydraulically damping rubber bush bearing according to claim 1, wherein said first chamber and said second chamber are respectively in a region of said axially shorter sides with each of said first chamber and second chamber being filled with fluid damping agent and having axial ends with each axial end having one of said undercut sections.

3. A hydraulically damping rubber bush bearing according to claim 2, wherein said first chamber and said second chamber are separated from one another by longer axial extent portions of said elastomeric bearing body, said longer axial extent portions of said elastomeric bearing body each being in a region of a respective one of said long sections of said inner cage.

4. A hydraulically damping rubber bush bearing according to claim 3, wherein, each of said short sections of said inner cage is disposed between adjacent long sections of said inner cage.

5. A hydraulically damping rubber bush bearing according to claim 4, wherein said metallic inner part has a flattened area extending over said length along said bearing axis axial in an area facing an inner chamber wall of at least one of said two chambers.

6. A hydraulically damping rubber bush bearing according to claim 4, wherein said metallic inner part has opposed flattened areas extending over said length along said bearing axis axial, each of said opposed flattened areas facing an inner chamber wall of a respective one of said two chambers with each chamber arranged between the one of said flattened areas of said metallic inner part and one of said short sections of said inner cage.

7. A hydraulically damping rubber bush bearing in accordance with claim 1, wherein said chambers have walls that are located radially on the outside to form outer chamber walls with a shape sloped relative to said bearing axis in an area of said undercut and formed by a corresponding shape of said corresponding inner chamber wall essentially following the shape of said inner chamber walls in the area of a section led in parallel to said bearing axis and through the center of the circumferential extension of a chamber.

8. A hydraulically damping rubber bush bearing in accordance with claim 7, wherein said inner and outer chamber walls have a constant distance from one another in an area of a section led in parallel to said bearing axis and through a center of the circumferential extension of a corresponding said chamber.

9. A hydraulically damping rubber bush bearing in accordance with claim 8, wherein said distance between said inner and outer chamber walls increases relative to the circumferential extension of said chambers in the outer areas, so that said chambers expand toward these outer areas and have an opening at 90° to the direction of damping, and stops made of rubber or plastic are formed in the area of circumferential extension at said inner and outer chamber walls.

10. A hydraulically damping rubber bush bearing in accordance with claim 9, wherein said metallic inner part has a flattened area extending over an entire axial length in the areas adjoining said inner chamber wall.

11. A hydraulically damping rubber bush bearing in accordance with claim 1, wherein said chambers comprise two chambers, each of said chambers having said undercut, wherein said undercuts of said two chambers are arranged diametrically in relation to one another relative to an axial extension of the bearing.

12. A hydraulically damping rubber bush bearing in accordance with claim 11, wherein said two chambers are arranged at an angle of 180° in relation to one another relative to the circumference of the bearing.

13. A hydraulically damping rubber bush bearing in accordance with claim 1, further comprising an outer sleeve with a circumferential shape adapted to said elastomeric bearing body and to said inner cage.

14. A hydraulically damping rubber bush bearing in accordance with claim 1, wherein said chambers comprise two chambers with said undercuts in an area of each axial chamber wall.

15. A hydraulically damping rubber bush bearing in accordance with claim 1, wherein a radial path of said elastomeric bearing body is limited by insert parts arranged between said inner part and said elastomeric bearing body and/or said elastomeric bearing body and said inner cage.

16. A hydraulically damping rubber bush bearing in accordance with claim 1, wherein each chamber has two undercuts sloping toward a direction of the bearing axis, said undercuts being arranged on axially opposed ends of each chamber.

17. A vertical mountable hydraulically damping rubber bush bearing, comprising:
a metallic inner part having an axial length along a bearing axis;
a metallic sleeve arranged concentrically with said inner part, said sleeve defining an inner cage with two opposing long sections having a long extent, and two remaining opposing short sections having the shortest extent;
an elastomeric bearing body arranged between said inner part and said inner cage, said elastomeric bearing body being connected with said inner cage by vulcanization, said elastomeric bearing body defining a first chamber and a second chamber connected with one another by a channel, said first chamber having a radially inner chamber wall with a parallel section substantially parallel to said bearing axis and an undercut section sloped relative to said bearing axis toward a direction of said bearing axis, said second chamber having a radially inner chamber wall with a parallel section substantially parallel to said bearing axis and an undercut section sloped relative to said bearing axis toward a direction of said bearing axis, said elastomeric bearing body having sides axially shorter than remaining sections, said first chamber and said second chamber being respectively in a region of said axially shorter sides with each of said first chamber and second chamber having axial ends with one of said undercut sections; and
a fluid damping agent in said first chamber and said second chamber.

18. A hydraulically damping rubber bush bearing in accordance with claim 17 wherein, wherein said undercut sections are arranged diametrically in relation to one another relative to an axial extension of the bearing.

19. A hydraulically damping rubber bush bearing in accordance with claim 18, wherein said first and second chambers are arranged at an angle of 180° in relation to one another relative to the circumference of the bearing.

20. A hydraulically damping rubber bush bearing in accordance with claim 17, wherein a distance between said inner chamber wall and an outer chamber wall of each of said first chamber and said second chamber increases relative to a circumferential extension of said chambers in outer areas wherein said first chamber and said second chamber expand toward said outer areas and have an opening at 90° with respect to a direction of damping, and said stops made of rubber or plastic are formed in an area of circumferential extension at said inner and outer chamber walls.

21. A hydraulically damping rubber bush bearing in accordance with claim 20, wherein said metallic inner part has a flattened area extending over an entire axial length in the areas adjoining said inner chamber wall.

22. A hydraulically damping rubber bush bearing in accordance with claim 17, further comprising an outer sleeve with a circumferential shape adapted to a shape of said elastomeric bearing body and to a shape of said inner cage, said outer sleeve having axially shortened sections in an area of said undercut sections of said chambers.

23. A hydraulically damping rubber bush bearing in accordance with claim 17, wherein a radial path of said elastomeric bearing body is limited by insert parts arranged between said inner part and said elastomeric bearing body and/or said elastomeric bearing body and said inner cage.

24. A vertical mountable hydraulically damping rubber bush bearing, comprising:
a metallic inner tube having an axial extent;
a metallic sleeve arranged annularly about said inner tube, said sleeve defining an inner cage with an upper edge and a lower edge defining two opposing long sections having a long axial extent and two remaining opposing short sections having the shorter axial extent, each of said short sections of said inner cage being disposed between adjacent long sections of said inner cage;
an elastomeric bearing body arranged between said inner tube and said inner cage, said elastomeric bearing body being connected with said inner cage by vulcanization and having an upper saddle-shape surface following a path of said upper edge of the inner cage from long sections to adjacent short sections and having a lower saddle-shape surface following a path of said inner cage from long sections to adjacent short sections to provide shortened axial extent portions respectively adjacent to said short sections of the cage and longer axial extent portions respectively adjacent to said long sections of the cage, said elastomeric bearing body defining a first chamber and a second chamber connected with one another by a channel, said first chamber having a radially inner chamber wall with a parallel section substantially parallel to said inner tube and undercut sections sloped relative to said inner tube and extending from respective ends of said parallel section toward said inner tube, said second chamber having a radially inner chamber wall with a parallel section substantially parallel to said inner tube and undercut sections sloped relative to said inner tube and extending from respective ends of said second chamber parallel section toward said inner tube, said first chamber being defined in one of said shortened axial extent portions and said second chamber being defined in another of said shortened axial extent portions with each of said undercut sections being parallel to and spaced from an adjacent upper surface or lower surface of said elastomeric bearing body; and a fluid damping agent in said first chamber and said second chamber.

25. A hydraulically damping rubber bush bearing according to claim 24, wherein said metallic inner tube has opposed flattened areas extending axially, each of said opposed flattened areas facing an inner chamber wall of a respective one of said first chamber and second chamber with each chamber arranged between the one of said flattened areas of said metallic inner part and one of said short sections of said inner cage.

26. A hydraulically damping rubber bush bearing in accordance with claim 25, further comprising an outer sleeve with a circumferential shape adapted to said elastomeric bearing body and to said inner cage.

27. A hydraulically damping rubber bush bearing in accordance with claim 26, further comprising channel means defining said channel, said channel means being located between said inner cage and said elastomeric bearing body and/or between said elastomeric bearing body and said outer sleeve and/or between said inner cage and said outer sleeve.

28. A hydraulically damping rubber bush bearing in accordance with claim 11, wherein said chambers arranged in the shortened axial extent portions of said elastomeric bearing body with a first shortened axial extent portion located between said inner part and said inner cage and between a first longer axial extent portion of said elastomeric bearing body and a second longer axial extent portion of said elastomeric bearing body and with said a second shorter axial extent portion located between said inner part and said inner cage and between said first longer axial extent portion of said elastomeric bearing body and said second axial extent longer portion whereby, said longer axial extent portions of said elastomeric bearing body separate each chamber.

* * * * *